Nov. 10, 1959 E. A. LOWRY 2,912,514

MAGNETIC RECORDER MECHANISM

Filed May 16, 1955 5 Sheets-Sheet 1

Inventor
EDGAR ALBERT LOWRY by Hill, Sherman, Meroni, Gross & Simpson Attys.

Nov. 10, 1959 E. A. LOWRY 2,912,514

MAGNETIC RECORDER MECHANISM

Filed May 16, 1955 5 Sheets-Sheet 2

Inventor
EDGAR ALBERT LOWRY by Hill, Sherman, Meroni, Gross & Simpson Attys.

Nov. 10, 1959 E. A. LOWRY 2,912,514

MAGNETIC RECORDER MECHANISM

Filed May 16, 1955 5 Sheets-Sheet 3

Inventor
Edgar Albert Lowry
by Hill, Sherman, Meroni, Gross & Simpson
Attys.

Nov. 10, 1959 E. A. LOWRY 2,912,514

MAGNETIC RECORDER MECHANISM

Filed May 16, 1955 5 Sheets-Sheet 4

Inventor
EDGAR ALBERT LOWRY
by Hill, Sherman, Meroni, Gross & Simpson Attys.

Nov. 10, 1959 E. A. LOWRY 2,912,514

MAGNETIC RECORDER MECHANISM

Filed May 16, 1955 5 Sheets-Sheet 5

Inventor
Edgar Albert Lowry by Hill, Sherman, Meroni, Gross & Simpson
Attys.

United States Patent Office 2,912,514

Patented Nov. 10, 1959

2,912,514

MAGNETIC RECORDER MECHANISM

Edgar A. Lowry, Columbus, Ohio, assignor to Thompson Ramo Wooldridge Inc., Cleveland, Ohio, a corporation of Ohio Application May 16, 1955, Serial No. 508,698

7 Claims. (Cl. 179—100.2)

This invention relates to a magnetic recorder mechanism and more particularly a magnetic tape recorder which has an improved plural speed drive mechanism with equalization automatically changed with a change in drive speed, and which uses a minimum number of controls for controlling the drive mechanism and electrical control and amplifying apparatus.

The magnetic tape recorder of this invention was developed with the general object of providing a compact, portable, easily operated and reliable unit for high fidelity tape recording and reproducing, as is desirable for use in homes, houses and in general applications.

The unit comprises a tape driving assembly which drives the tape past a transducer head assembly and an electrical control and amplifying assembly for either applying amplified signals to the transducer head assembly for recording or amplifies signals from the transducer head assembly for reproduction. In accordance with a specific feature of the invention, the tape driving assembly and the electrical control and amplifying assembly may be separately assembled with the control knobs for both the driving assembly and the electrical control and amplifying assembly being included in the driving assembly and with mechanical couplings from certain of such knobs through controls of the electrical control and amplifying assembly. Such mechanical couplings are of such form that they can be readily effected on installation of the assemblies in the unit.

In accordance with a further feature of the invention, certain of the manually actuated controls serve to control both the driving mechanism and the electrical amplifying and control apparatus. In particular, a manually actuated control which controls the drive speed of the mechanism also serves to automatically control equalization in the amplifier apparatus. Such control may also actuate a switch controlling energization of the unit.

Another feature is in the control of operation of the driving mechanism through depression of a button or knob, which knob is also rotatable to control the amplifying apparatus. Preferably, one knob is depressible to control drive of the mechanism in one direction, as for rewind operation, and such knob is also rotatable to control the tone or frequency response characteristics of the amplifying apparatus, and another knob is depressible to control drive in the reverse direction, and such knob is rotatable to control the volume or amplification of the amplifying apparatus.

In accordance with a further feature of the invention, a first knob is depressible to initiate drive of the tape in one direction (for example, in a rewind direction) and a second knob is depressible to stop operation in such one direction and also to cause operation in a reverse direction (for example, in a forward direction). This is advantageous because it is usually desirable to continue the rewinding operation for a substantial length of time and hence it is advantageous that the rewind operation should not be stopped upon release of the control button or knob therefor. However, fast forward drive of the tape is normally desired only for short intervals of time and it is desirable that such a drive be continued only so long as the control button or knob therefor is depressed. Accordingly, the knob controlling forward operation may also serve as a means for stopping the rewind operation.

In accordance with still another feature of the invention, a manually actuatable control is shiftable from a stop position to a drive position for controlling drive of the tape in a forward direction, for either recording or reproducing operation, and the electrical control and amplifying apparatus includes a switch actuatable between a first position in which the apparatus is conditioned for reproducing operation and a second position in which the apparatus is conditioned for recording operation, means being provided for preventing actuation of the switch from one position to the other when the control is in the drive position.

A highly important feature of the invention is in the mechanism for driving the tape at a plurality of speeds. In this mechanism, drive from a driven member, such as the drive shaft of an electric motor, is transmitted through an idler roller to a driving member, such as a flywheel secured to a capstan which drives the tape, and one of such members is provided with a plurality of cylindrical portions of different diameters and a plurality of idler rollers are provided, one for each of such cylindrical portions.

With drive of a driving member from a driven member through an idler roller, the drive force exerted on the idler by the driven member together with the dragging force exerted by the idler on the driving member produce a force having components urging the idler toward pressure engagement with the members. It can be shown that the force components urging the idler toward each member is at a maximum when the lines tangent to the points of engagement of the idler with the members are at right angles to each other, or when a line from the axis of the idler and the axis of one member is at right angles to a line through the axis of the idler and the axis of the other member. With a given spacing between the axes of the members and with given diameters of the members, a certain diameter of idler is required to produce this condition, which can be determined mathematically or by trial and error. Of course, with another force, or other forces, acting to urge the idler in any particular direction, the optimum diameter of idler may be changed to some extent, which can likewise be determined mathematically or by trial and error. In any event, it is readily apparent that a certain diameter and slide bar or support of idler be used for each drive speed. This is achieved in the mechanism of this invention through the use of the separate and separately supported idlers.

Further features of the plural speed drive mechanism reside in the means for effecting selective engagement of the idlers with the driving and driven members.

A still further feature of the invention is in the provision of improved means for braking the supply and take-up reels which includes a pair of braking means for engaging the peripheral surfaces of supports for the reels and means supporting such braking means for conjoint movement into and out of engagement with such supports.

An object of this invention, accordingly, is to provide an improved combination of a drive mechanism and electrical control and amplifying apparatus in a recorder unit.

Another object of this invention is to provide an improved recorder unit in which the number of controls is minimized by using single controls to perform dual functions.

A further object of this invention is to provide an improved plural speed drive mechanism.

Still another object of this invention is to provide improved spool braking means.

This invention contemplates other objects, features and advantages which will become more fully apparent from the following detailed description taken in conjunction with the accompanying drawings which illustrate a preferred embodiment and in which.

Figure 1:
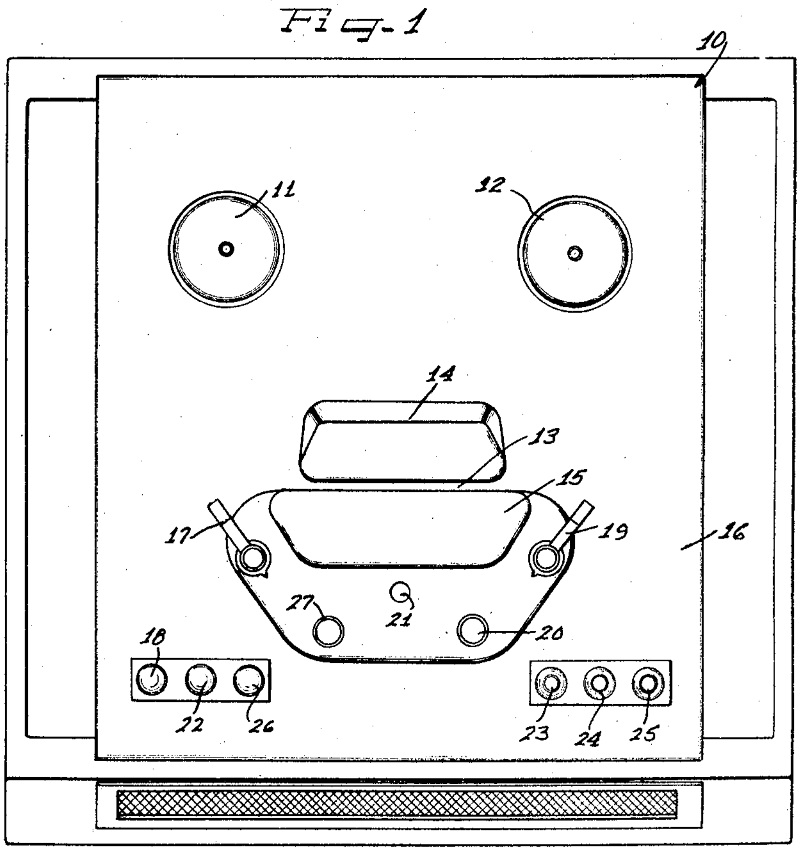
Figure 1 is a top plan view of a recorder unit constructed according to the principles of this invention.
Figures 6, 9:
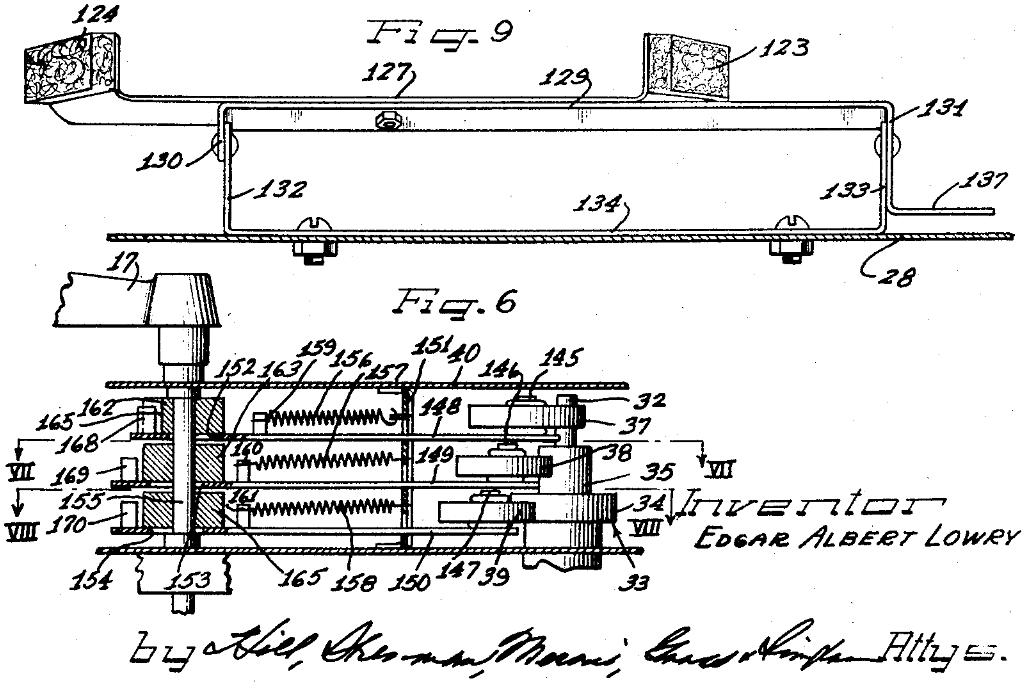
Figure 6 is a sectional view taken substantially along line VI—VI of Figure 2.
Figure 9 is a sectional view taken substantially along IX—IX of Figure 2.

Reference numeral 10 generally designates a magnetic recorder mechanism constructed in accordance with the principles of this invention. In the recorder 10, a tape supply reel is mounted on a rotatable support 11 and a tape take-up reel is mounted on a rotatable support 12. The tape, in passing between the supply reel and the take-up reel, is disposed in a slot 13 defined by protective housing means 14 and 15 upstanding from a main cover plate 16.

In the general operation of the recorder 10, a lever 17 is moved from an "off" position to a position for the desired speed of operation which may be 7½ inches per second, 3¾ inches per second, or 1⅞ inches per second. An indicating light 18 will be energized at this time. If it is desired to reproduce a recording on a tape, a lever 19 may be turned from a "stop" position to a "run" position, and the drive of the tape will then be initiated. The volume or amplitude of sound reproduction may then be controlled by turning a volume control knob 20. To stop the reproducing operation, the knob 19 may be turned from the "run" position to the "stop" position.

For recording operation, a button 21 is depressed and simultaneously the lever 19 is rotated from the "stop" position to the "run" position. A "record" signal light 22 will then be energized. Signals to be recorded may be coupled to the recorder 10 by inserting plugs connected to microphones or other sources such as a radio, into jacks 23, 24 or 25. The recording level is controlled by rotating the knob 20 and its position should be such that a "level" indicating lamp 26 flashes periodically.

In either reproducing or recording operation, the tone may be controlled by rotating a control knob 27. The control knob 27 also functions as a control for rewinding the tape from the take-up reel on the support 12 back to the supply reel on the support 11. This may be accomplished by simply depressing the knob 27 with the control lever 19 in its "stop" position.

The knob 20, in addition to functioning as a volume control, also functions as a "fast forward" control, and as a means for stopping the rewinding operation. In particular, after the knob 27 is depressed, the rewinding operation will continue until the knob 20 is depressed. By depression of the knob 20 to a further extent, the tape will be driven at a fast forward speed.

Figure 2:
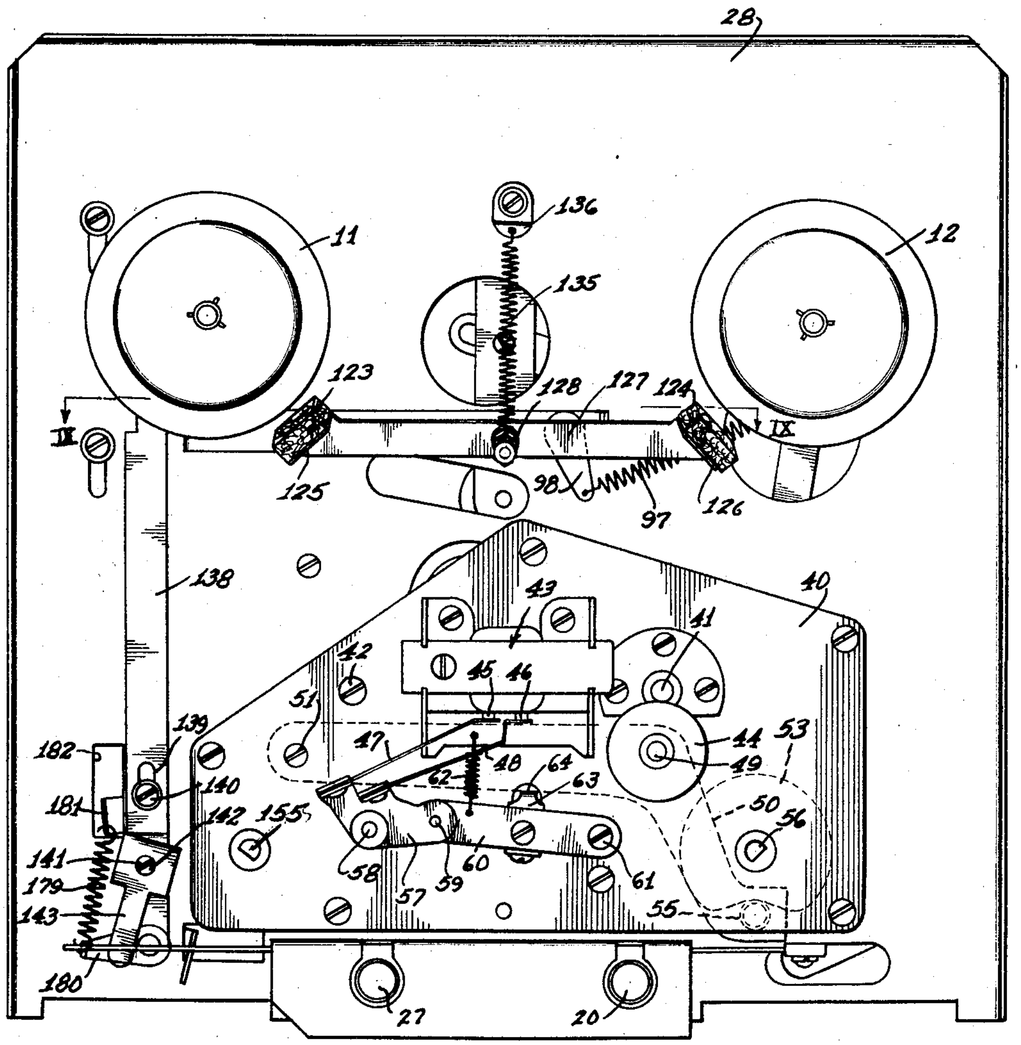
Figure 2 is a view similar to Figure 1, but with a cover plate and other elements removed to illustrate the drive mechanism.
Figure 3:
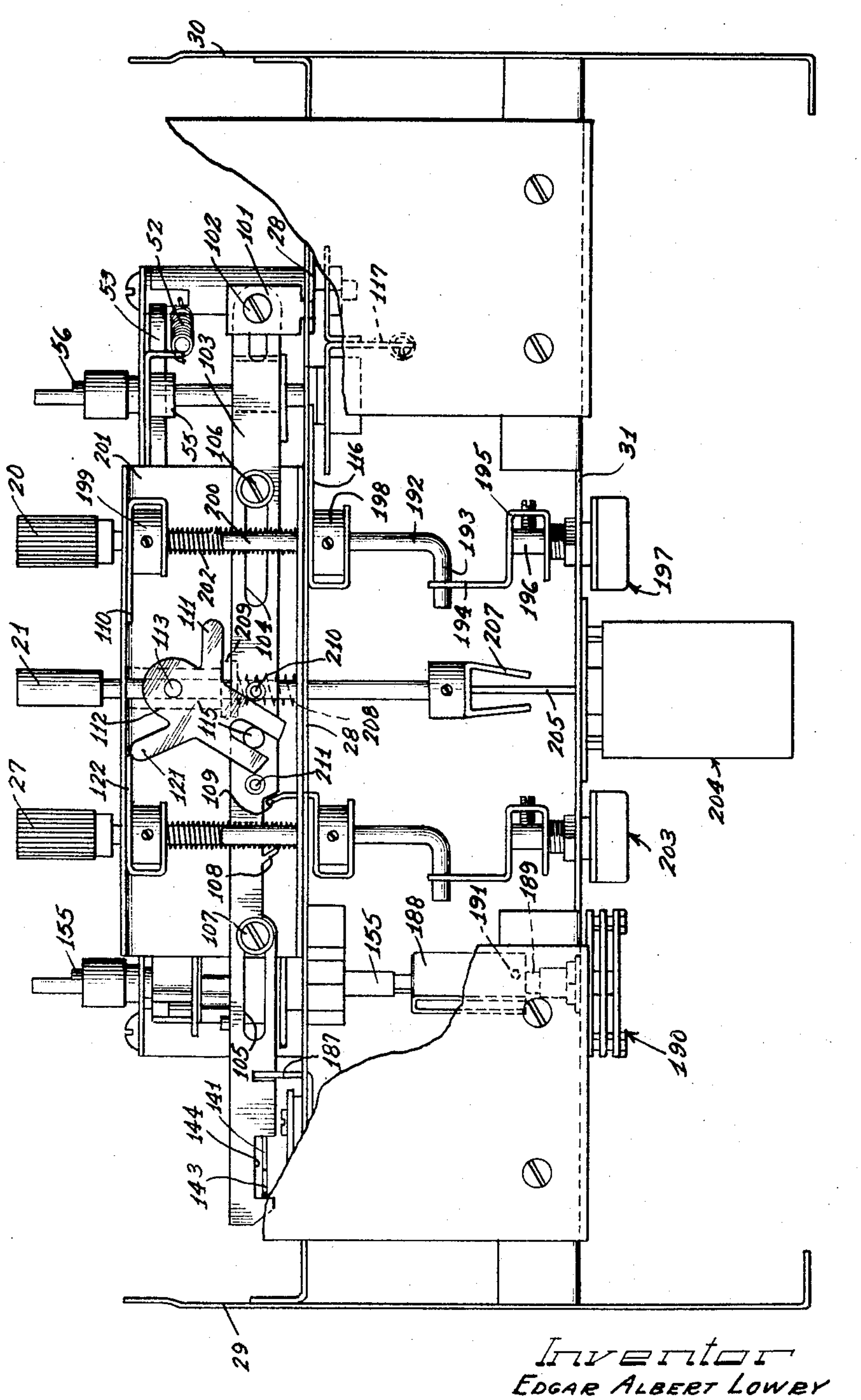
Figure 3 is a front elevational view of the structure of the plan view of Figure 2.

Referring now to Figure 2, which is a top plan view of the mechanism with the cover plate 16 removed, the tape driving mechanism is assembled on a horizontal plate 28. This plate 28, as shown in the front elevational view of Figure 3, is supported between upright support plates 29 and 30. Also supported by the upright support plates 29 and 30 is a plate 31 in spaced relation below the plate 28 which supports the electrical control and amplifying apparatus of the recorder 10.

To drive the tape driving mechanism, an electric motor (not shown) is suspended below the plate 28 and has a shaft 32 projecting upwardly through an opening in the plate 28. Mounted on the shaft 32 is a drive member 33 having a large diameter lower portion 34 and a smaller diameter upper portion 35 of greater diameter than the shaft 32 and positioned below the upper end of the shaft 32.

Drive from the shaft 32 to a flywheel 36 may be selectively transmitted by idler rollers 37, 38 and 39. The roller 37 has a vertical position such that it may engage the shaft 32 above the member 33 and impart a relatively slow speed drive to the flywheel 36. The roller 38 is arranged so that it can engage the portion 35 of intermediate diameter and impart a higher drive speed to the flywheel 36 while the roller 39 is arranged to engage the large diameter portion 34 and impart a still higher drive speed to the flywheel 36.

The mechanism for supporting and selectively controlling the engagement of the rollers 37, 38 and 39 with the shaft 32 and portions 35 and 34 of the member 33 forms a highly important feature of the present invention and will be described in detail hereinafter.

The flywheel 36 is journalled between the support plate 28 and a plate 40 supported in spaced relation above the plate 28, with a shaft 41 secured to, or integral with, the flywheel 36 projecting above the plate 40. The tape in passing from the supply reel to the take-up reel engages a guide 42 upstanding from the plate 40 and then passes across a transducer and erasing head assembly 43 about a portion of the shaft 41. To impart drive to the tape, it is pressed into engagement with the shaft 41 by a roller 44. The tape is pressed into engagement with the transducer and erase head assembly 43 by pads 45 and 46 carried on resilient arms 47 and 48, respectively.

The roller 44 is journalled on a shaft 49 which is carried by a lever 50 just below the plate 40 and pivotal on a bolt 51. The lever 50 is urged in a counter-clockwise direction, as viewed from above, by a tension spring 52, but is movable in a clockwise direction against the action of the spring 52 by a cam 53 which engages a roller 54 journalled on a pin 55 depending from the lever 50. The cam 53 is secured to a shaft 56 which is journalled between the plate 40 and the plate 28 and which projects upwardly from the plate 40 through the cover plate 16 and has the control lever 19 secured thereto. When the control lever 19 is in its "stop" position, the cam 53 moves the lever 50 to position the roller 44 out of engagement with the shaft 41, but when the lever 19 is moved to its "run" position, the lever 50 is allowed to move counter-clockwise under the action of the spring 52 to urge the roller 44 toward the shaft 41 and impart drive to the tape therebetween.

The lever 50 also controls engagement of the pads 45 and 46 with the transducer and erase head assembly 43. In particular, the arms 47 and 48, which carry the pads 45 and 46, are carried on a lever 57 pivotal on a pin 58 upstanding from the plate 40. The lever 57 is coupled through a pin 59 to a lever 60 pivoted on a bolt 61. The lever 60 is urged in a clockwise direction, as viewed from above, by a spring 62, so that the lever 57 is urged counter-clockwise to urge the pads 45 and 46 into engagement with the transducer and erase head assembly 43. To move the pads 45 and 46 out of engagement with the assembly 43, the lever 60 carries an abutment member 63 which has a depending portion 64 projecting downwardly through an opening 65 in the plate 40 into the path of the lever 50. When the lever 50 is moved in a clockwise direction to move the roller 44 out of engagement with the shaft 41, the lever 60 is moved in a counter-clockwise direction to move the lever 57 in a clockwise direction and move the pads 45 and 46 out of engagement with the head assembly 43.

Figure 4:
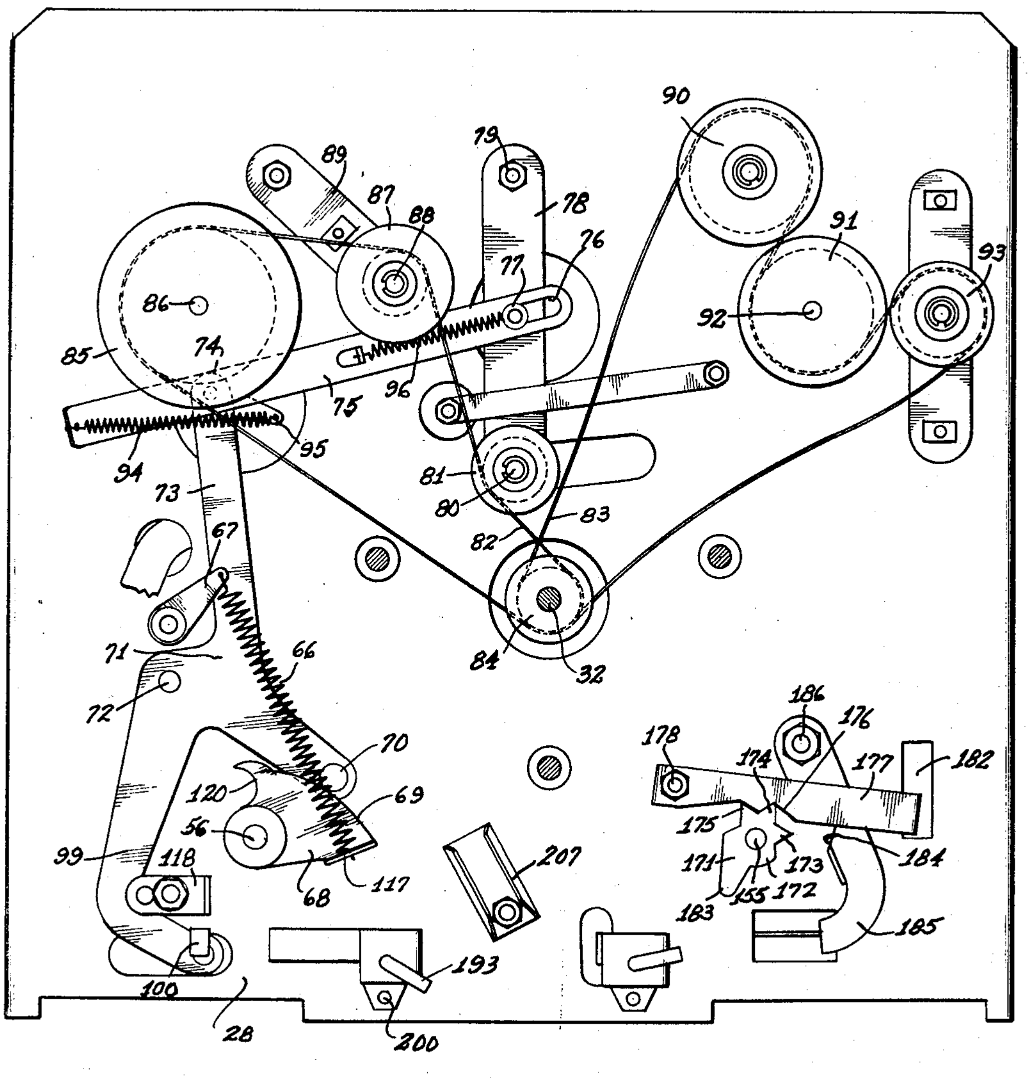
Figure 4 is a bottom plan view of the drive mechanism, looking substantially from along line IV—IV of Figure 3.

In order to lock the control lever 19 and the actuating elements secured thereto in either the "stop" position or the "run" position, an over-center spring arrangement is utilized which comprises a tension spring 66 on the underside of the plate 28, as shown in the bottom plan view of Figure 4, which has one end secured to a lug 67 secured to the plate 28 and its other end secured to a lever 68 affixed to the lower end of the shaft 56. The position of the parts as illustrated is in the "run" position of the lever 19 and when the lever 19 is moved to its "stop" position, the lever 68 will be rotated clockwise, as viewed from below, from the full line position of Figure 4 to the dotted line position of Figure 4 and the spring will act on the opposite side of the axis of the shaft 58.

The lever 68 also serves as a means for controlling drive of the take-up reel support 12. For this purpose, the lever 68 has an adge portion 69 defining a cam surface engaged with a cam followed 70 on a lever 71 pivoted on a bolt 72 secured to the plate 28. The lever 71 has a rearwardly extending leg 73 which at its terminal end carries a pin 74 which extends through a slot in a link member 75. The link member 75 has a second slot 76 which receives a pin 77 secured to a lever 78 pivoted on a bolt 79 secured to the plate 28. The plate 78 carries a pin 80 on which an idler roller 81 is journalled.

The idler roller 81 is arranged to be selectively moved either into engagement with a belt 82 to cause drive of the take-up reel or a belt 83 to cause drive of the supply reel for rewinding operation. In particular, the belts 82 and 83 are trained over vertically spaced portions of a pulley 83 secured to the shaft 32 of the electric motor. The belt 82 is trained about a pulley 85 secured to a shaft 86 which carries the take-up reel support 12 and also about an idler pulley 87 journalled on a pin 88 which is supported from the plate 28 by a suitable bracket 89.

The belt 83, similarly, is trained about an idler pulley 90, thence about a pulley 91 secured to a shaft 92 which carries the supply reel support 11 and thence about a second idler pulley 93. With the lever 78 in the position illustrated in Figure 4, the pulley 81 is pressed against the belt 82 to tension the same and cause drive of the take-up reel support 12 from the pulley 84. When the lever 78 is moved counter-clockwise as viewed from below, the pulley 81 will engage the belt 83 to tension the same and cause drive of the supply reel support 11.

Movement of the lever 78 is, of course, controlled from the lever 71. As indicated above, the arm 73 of the lever 71 is connected to the lever 78 through the link 75. In addition to the parts above described, a tension spring 94 is provided between a lug 95 carried by the lever 73 and the left hand end of the link 75, as viewed in Figure 4. A second tension spring 96 acts between the pin 77 and the link 75 to urge the lever 78 clockwise relative to the link 75. A third tension spring 97, above the plate 28 as viewed in Figure 2, acts between the pin 74 and a lug 98 secured to the plate 28, to urge the lever 71 clockwise, as viewed from below, and press the cam follower 70 against the cam surface 69.

With the control lever 19 in its "run" position as illustrated, the levers 68 and 71 will be in the positions illustrated in Figure 4 and the lever 78 will be pulled in a clockwise direction as viewed from below by the spring 96 to resiliently urge the roller 81 into engagement with the belt 82 and cause drive of the pulley 85 from the pulley 84 to cause drive of the take-up reel support 12.

When the control lever 19 is moved from the "run" position illustrated and the "stop" position, the lever 68 will be rotated clockwise as viewed from below as in Figure 4, to a position as illustrated in dotted lines in Figure 4 and the lever 71 is allowed to move clockwise under the influence of the spring 97 (above the plate 28 as viewed in Figure 2).

This clockwise movement of the lever 71 under the influence of the spring 97 is ordinarily limited in a manner as will be described hereinafter and the position of the link 75 is ordinarily such that the roller 81 is in an intermediate position such that it does not tension either of the belts 82 or 83. However, the lever 71 may, for rewind operation as will be described, be allowed to rotate clockwise to a further extent to cause the link 75 to move to the left as viewed in Figure 4 to engage the pin 77 and push the lever 78 in a counter-clockwise direction as viewed from below. During this operation, the tension spring 94 functions to resiliently urge the link 75 together with the lever 78 to the right and thus resiliently press the roller 81 against the belt 83, to tension the belt 83 and cause drive of the pulley 91 from the pulley 84 and thus cause drive of the supply reel support 11.

As indicated above, means are provided for normally limiting movement of the lever 71 to a position in which the roller 81 is in a neutral position out of pressure engagement with either of the belts 82 and 83, but such means are releasable to permit further movement of the lever 71 under the influence of the spring 97 to move the roller 81 into pressure engagement with the belt 83, for rewind operation. For this purpose, the lever 71 has a forwardly extending arm portion 99 which is apertured to receive a depending end portion 100 of a lug 101 secured by a bolt 102 to the right hand end of a horizontally reciprocable slide bar 103, as illustrated in Figure 3. The slide bar 103 has slots 104 and 105 receiving fixed bolts 106 and 107 to allow such horizontally reciprocable movement. With the control lever 19 in its "run" position, the slide bar 103 is disposed in the position illustrated in Figure 3. When the control lever 19 is moved from its "run" position to its "stop" position, the slide bar 103 will be moved by the lever 71 to the right, as viewed in Figure 3, until a depending tooth 108 thereon engages a stop 109 connected to the tone and rewind control button 27.

When the button 27 is depressed, the stop 109 is moved downwardly out of the path of the tooth 108 to allow the slide bar 103 to be moved to the right by the lever 71 which is at this time actuated by the spring 97 and which through the link 75 and lever 78 moves the roller 81 into resilient pressure engagement with the belt 83 to cause drive of the supply reel support member 11 in a manner as above described.

The connection of the stop 109 to the control button 27 will be described in detail hereinafter. It may be noted at this point, however, that the stop member 109 is so supported that it may be resiliently moved downwardly and both the stop member 109 and the tooth 108 are so inclined that when the slide bar 103 is moved to the left from its extreme right position, the tooth 108 may move past the stop 109 in ratchet-like fashion.

As previously indicated, the rewind operation may be stopped by depressing the control button 20. For this purpose, an actuator 110 is so connected to the control button 20 as to move downwardly therewith into engagement with an arm 111 of a lever 112 pivoted on a bolt 113 and having a bifurcated portion defining a slot 114 receiving a pin 115 on the slide bar 103. When the actuator 110 is moved downwardly by depression of the control button 20, the lever 112 will be moved in a clockwise direction as viewed from the front and the slide bar 103 will be moved to the left. The extent of movement of the slide bar 103 may be such as to restore the roller 81 to its neutral position, or the slide bar 103 may be moved further to the left to cause the lever 71 to be pivoted in a counter-clockwise direction as viewed from below and to cause the roller 81 to be moved into pressure engagement with the belt 82 and thus cause drive of the take-up reel support 12. This thus achieves the fast forward drive independent of the shaft 41, etc.

It may be noted that when the control button 20 is depressed to achieve the "fast forward" operation, actuation of the control lever 19 from its "stop" position to its "run" position is prevented by means of a stop member 116 connected to the button 20 which is lowered into the path of a depending flange portion of the lever 68 when the button 20 is depressed. The flange portion 117 of the lever 68 also serves as an attachment means for the spring 66. It might also be noted, at this point, that clockwise movement of the lever 68, as viewed from below, is limited by engagement of the flange portion 117 with a stop lug 118 secured to the plate 28.

It may further be noted that with the button 27 depressed for the rewind operation, the lever 19 will, of course, be in its "stop" position and movement of the lever 19 to its "run" position is prevented because a portion 120 of the lever 68 will engage the cam follower 70 on the lever 71.

As a further safety feature, actuation of the button 27 is prevented when the control lever 19 is in its "run" position by means of another arm 121 on the member 112 which is disposed in the path of a member 122 movable downwardly with the button 27.

A feature of the invention is in the provision of means for braking the supply reel support 11 and the take-up reel support 12 when the control lever 19 is in its "stop position" and when neither of the buttons 20, 27 is depressed, and for releasing such brake means when the lever 19 is moved to its "run" position or when either of the buttons 20, 27 is depressed. For this purpose, a pair of braking pads 123 and 124, arranged to engage the support members 11 and 12 are secured to up-turned flange portions 125 and 126 at opposite ends of a lever 127 centrally pivoted on a bolt 128 secured to a member 129 which has down-turned flange portions 130 and 131 pivoted to up-turned flange portions 132 and 133 of a bracket 134 secured to the plate 28 so that the member 129 is pivotal on a horizontal axis generally parallel to a line through the axes of the reel support members 11 and 12. The braking pads 123 and 124 are urged into engagement with the peripheral surfaces of the reel support members 11 and 12 by a tension spring 135 between the bolt 128 and a lug 136 secured to the plate 28. The pivotal support of the lever 127 on the member 129 serves to equalize the forces exerted by the pads 123 and 124 on the reel support members 11 and 12.

To move the braking pads 123 and 124 out of engagement with the reel support members 11 and 12, the member 129 has a portion 137 projecting laterally from the lower end of the down-turned flange 130, below the axis of pivotal movement of the member 129, which portion 137 is apertured to interlockingly receive the rearward end of a bar 138. The bar 138, adjacent its forward end, has a longitudinally extending slot 139 which receives a bolt 140 secured to the plate 28, so that the bar 138 is slidable rearwardly to pivot the member 129 and move the braking pads 123 and 124 out of engagement with the reel support members 11 and 12.

To actuate the slide bar 138, a plate 141 in front of the forward edge of the bar 138 is pivoted on a pin 142 and has a forwardly extending arm portion 143 received in a slot 144 in the slide bar 103. When the slide bar 103 is in its neutral position, the plate 141 will be in a neutral position with its rearward edge parallel to the forward edge of the bar 138 and the bar 138 will be in a forward position with the braking pads 123 and 124 in engagement with the reel support members 11 and 12. When the slide bar is actuated to the left or right out of its neutral position, the plate 141 will be rotated clockwise or counter-clockwise to cam the bar 138 rearwardly and the braking pads 123 and 124 will be disengaged from the reel support members 11 and 12.

As previously indicated, the mechanism for supporting the rollers 37, 38 and 39 and for selectively controlling the engagement thereof with the shaft 32 and portions 35 and 34 of the member 33 forms a highly important feature of the invention. Referring to Figures 5–8, the rollers 37, 38 and 39 are respectively journalled on pins 145, 146 and 147 which are carried by plates 148, 149 and 150. The plates 148, 149 and 150 are supported and guided for movement in vertically spaced slots in an upright bracket member 151 secured between the plate 28 and the plate 40. For further guiding and support of the plates 148, 149 and 150, they are respectively provided with slots 152, 153 and 154 through which a vertical shaft 155 extends, the control lever 17 being secured to the upper end of the shaft 155.

The plates 148, 149 and 150 are biased in a direction such that the rollers 37, 38 and 39 are urged into engagement with the shaft and shaft portions 32, 35 and 34 and the aligned surface portions of the flywheel 36. For this purpose, tension springs 156, 157 and 158 are secured between the plate 151 and pins 159, 160 and 161 on the plates 148, 149 and 150, respectively.

Figure 5:
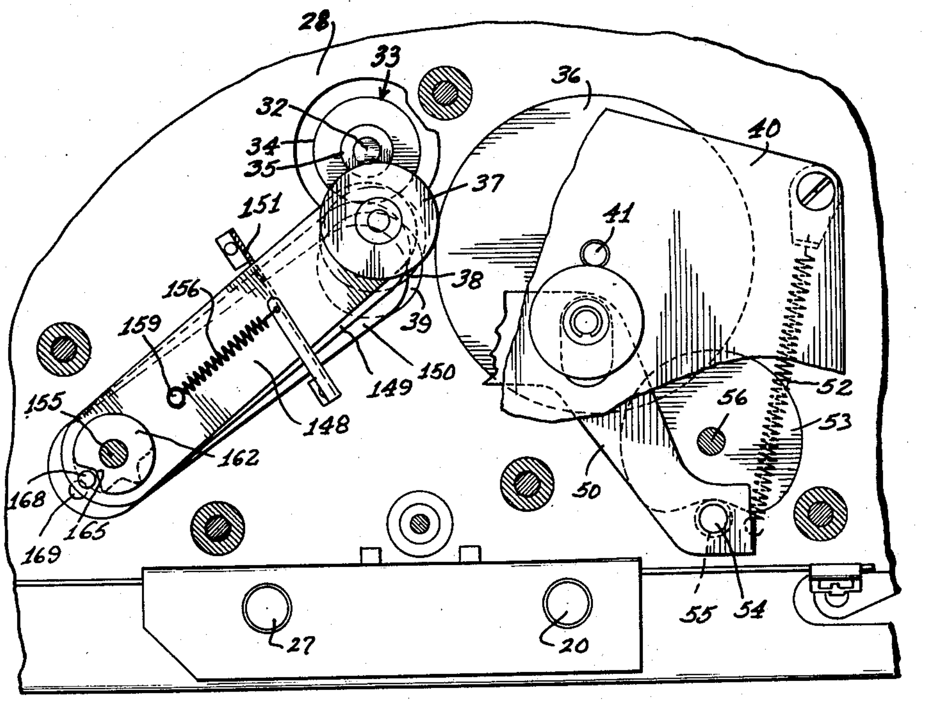
Figure 5 is a sectional view taken substantially along line V—V of Figure 3.

By reason of the use of separate idler rollers, for each drive speed, and because of the independent support thereof, the optimum drive engagement of the rollers with the driven and driving members is possible. As shown in Figure 5, in which figure the roller 37 is operative, the angle between a line tangent to the point of engagement between the roller 37 and the shaft 32 and a line tangent to the point of engagement between the roller 37 and the flywheel 36 is slightly less than 90°. Without the spring 156 urging the roller 37 into engagement with the shaft 32 and the flywheel 36, the optimum angle would be 90° but with the spring 156 so acting, it will be appreciated that the optimum angle is somewhat less than 90°, as is illustrated. It may be noted that this angle is sometimes referred to as the "grab angle."

Figures 7, 8:
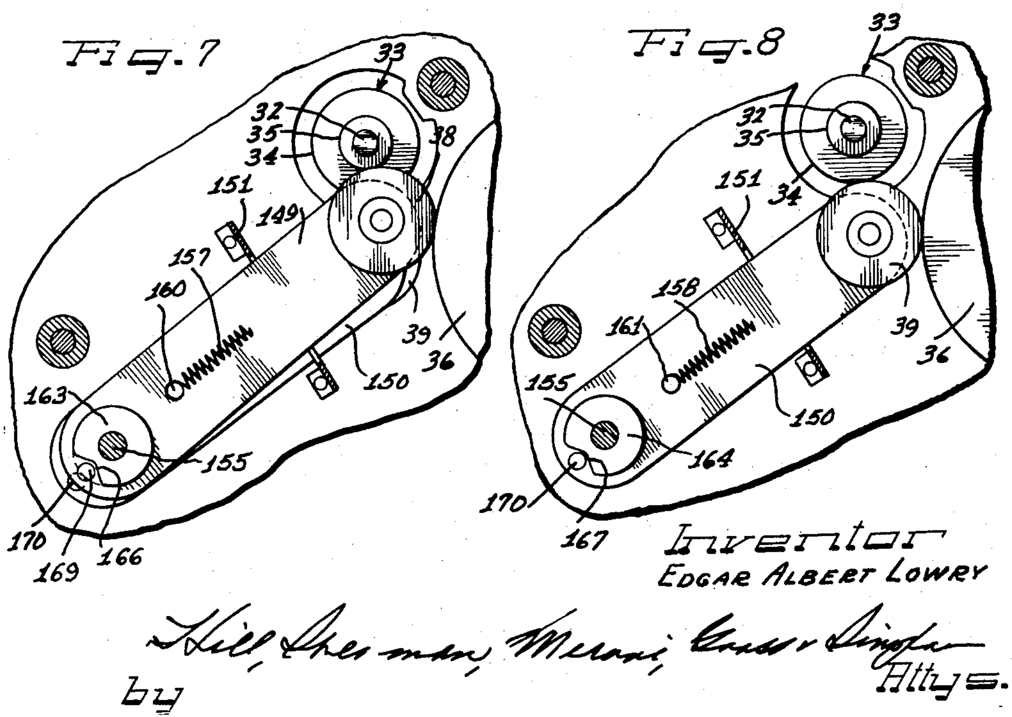
Figure 7 is a sectional view taken substantially along line VII—VII of Figure 6.
Figure 8 is a sectional view taken substantially along line VIII—VIII of Figure 6.

As shown in Figure 7, in which the roller 38 is engaged between the portion 35 and the flywheel 36, the angle between a line tangent at the point of engagement between the roller 38 and the portion 35 and a line tangent at the point of engagement between the roller 38 and the flywheel 36 is slightly less than 90°, this being the optimum condition with the action of the tension spring 157 taken into consideration.

A similar angle exists with the idler roller 39 engaged, as is shown in Figure 8.

It may be noted that with any given diameters of the driven and driving members and with any given spacing between the axes thereof, a certain roller diameter is required for any given spring force or, conversely a certain spring force is required for any given roller diameter. Because of the fact that the pressure of engagement between the idler rollers and the surfaces of the driven and driving members automatically increases as the driving forces increase, it is desirable that the "grab angle" should be 90°, since under this condition, such forces are at a maximum. However, the springs are desirable to obtain an initial driving engagement between the idler rollers and the driving and driven members and also to simplify the mechanism for selectively controlling engagement of the idler rollers. In the particular mechanism illustrated, it was found desirable that the rollers 38 and 39 should have the same diameter, with the effective forces of the springs 157 and 158 being slightly different, but the roller 37 has a somewhat larger diameter.

To allow movement of the rollers 37, 38 and 39 into engagement with the shaft 32 and portions 35 and 34 of the member 33, as well as the flywheel 36, cam members 162, 163 and 164 are affixed to the shaft 155 above the plates 148, 149 and 150 and have recesses 165, 166 and 167 in arcuately spaced relation for receiving pins 168, 169 and 170 secured to the plates 148, 149 and 150, respectively.

By moving the control lever 17 to one angular position, the pin 163 may move into the recess 165 to allow the roller 37 to engage between the shaft 32 and the flywheel 36. At another angular position of the control lever 17, the pin 169 may have into the recess 166 to engage the roller 38 with the portion 35 and the flywheel 36, and at another angular position of the control lever 17, the pin 170 can move into the recess 167 to allow the roller 39 to engage between the portion 34 and the flywheel 36. At a fourth angular position of the control lever 17, none of the pins 168, 169 or 170 will be disposed in the recess and the rollers 37, 38 and 39 will all be inoperative. This, of course, is the "off" position of the control lever 17.

To releasably lock the control lever 17 into any position into which it is actuated, a cam member 171 is secured to the shaft 155 below the plate 28, the cam member 171 having lobes 172, 173, 174 and 175 for engaging in a recess 176 and a lever 177 pivoted on a bolt 178 secured to the plate 28. The plate 177 is resiliently urged in a clockwise direction as viewed from below into pressure engagement with the cam member 171 by a tension spring 179 on the upper side of the base plate 28 between a lug 180 secured to the plate 28 and an up-turned end portion 181 of the lever 177 which extends upwardly through an opening 182 in the plate 28.

The slide bar 103 is locked against actuation to the right, as viewed from the front, when the control lever 17 is in its off position. For this purpose, the cam member 171 has a lobe 183 which engages in a recess 184 in a lever 185 pivoted by a bolt 186 to the base plate 28, the lever 185 having an upturned flange portion 187 engaged in a slot 188 in the slide bar 103. The lobe 183 is engaged in the recess 184 when the lever 17 is in its "off" position to prevent clockwise movement of the lever 185 as viewed from below and thus prevent movement of the slide bar 103 to the right as viewed from the front.

In addition to controlling the drive speed of the tape-driving mechanism, the lever 17 also controls energization of the machine and equalization in the recording operation. For this purpose, the lower end of the shaft 155 is rectangular and engages in a rectangular slot in the bight portion of a member 188 of inverted U-shape, the member 188 being coupled to the shaft 189 of a control switch 190 through a pin 191 extending through the legs of the member 188 and through the shaft 189.

The high frequency response in the recording and reproducing operation decreases as the tape drive speed decreases and to at least partially compensate for the variation in high frequency response, it is desirable that the high frequency response of the amplifier of the recorder be increased in amounts depending upon the drive speeds. The switch mechanism 190 serves to control the high frequency response of the amplifier of the recorder 10, to achieve this result. It will be apparent to those skilled in the art that the switch mechanism 190 may take various forms to effectuate this purpose. The switch mechanism 190 may also control the energization of the machine.

As indicated above, the control button 20, in addition to controlling the "fast forward" operation, also serves as a volume control for the recorder 10. For this purpose, the control button 20 is affixed to a shaft 192 which has a laterally projecting lower end portion 193 disposed in a groove in an up-turned flange portion 194 of a member 195 secured to a shaft 196 of a volume control 197 on the plate 31, the shaft 194 being coaxial with the shaft 192. Thus, by rotation of the control knob 20, the volume control shaft 196 is rotated.

The actuator 110 and the stop member 116 are preferably so connected to the control button 20 that rotation of the button 20 will not cause rotation of the members 110 and 116 but vertical movement of the button 20 will cause corresponding vertical movement of the members 110 and 116. For this purpose, the shaft 192 has secured thereto sleeves 198 and 199 which are disposed in generally U-shaped portions of the members 110 and 116. The member 116 may carry a pin 200 movable in an opening in the plate 28 eccentric to the shaft 192, to prevent rotation of the member 116. The member 110 may have a projection movable in a slot and a vertical plate 201 secured to the base plate 28, for a similar purpose.

The button 20 is preferably urged upwardly by a coiled compression spring 202 about the shaft 192 between the plate 28 and the member 110.

The control button 27 is connected to a tone control unit 203 and to the members 109 and 122 in a manner exactly the same as the connection of the button 20 to the volume control 197 and the members 116 and 110, and such connections will therefore not be described in detail.

The electrical control and amplifying apparatus of the recorder 10 includes a switch 204 which has an actuator 205 which must be depressed for the recording operation. For this purpose, the button 21 is affixed to a shaft 206 which carries a member 207 of inverted U-shaped configuration having a bight portion for engaging the switch actuator 205. The button 21 is urged upwardly by a coiled compression spring 208 on the shaft 206 between the upper side of the base plate 28 and a collar 209 affixed to the shaft 206. The collar 209 serves also to lock the button 21 in its depressed position when the control lever 19 is moved from its "stop" position to its "run" position. For this purpose, the collar 209 is aligned with a pin 210 and is disposed thereunder when the slide bar 103 is moved to the left as viewed from the front. When the slide bar 103 is moved either to the left or to the right, actuation of the button 21 is prevented by engagement of the collar 209 with the pin 210 or with a pin 211 connected to the slide bar 103.

It will thus be appreciated that this invention provides a tape recorder unit having an improved drive mechanism and an improved combination between a drive mechanism and electrical control and amplifying apparatus. It will, of course, be appreciated that the principles of this invention are applicable to analogous machines and terms such as "tape" and "recorder" are used in a generic sense to include wire and other record mediums and reproducers, or other equivalents.

It will be understood that modifications and variations may be effected without departing from the spirit and scope of the novel concepts of this invention.

I claim as my invention:

1. In a tape recorder or the like including a tape driving mechanism and electrical control and amplifying apparatus, tape rewind means, tape take up means, a volume control element rotatably and slidably mounted in said tape recorder, a control shaft secured to said volume control element at one end, and in operative relation to said amplifying apparatus at the other end thereof for effecting volume adjustment in response to rotation of said volume control element, means responsive to predetermined inward movement of said volume control element relative to said tape recorder adapted to effect stopping of said rewind means and means responsive to further inward movement of said volume control element adapted to effect energization of said tape take up means.

2. In a tape recorder or the like including a reversible tape driving mechanism and electrical control and amplifying apparatus, tone and volume controls in said apparatus, a volume control element slidably and rotatably mounted in said tape recorder, means for actuating said volume control in response to rotation of said volume control element, and means responsive to inward movement of said volume control element for controlling drive of the tape in one direction, a tone control element slidably and rotatably mounted in said tape recorder, means for actuating said tone control in response to rotation of said tone control element and movable axially for controlling drive of the tape in a reverse direction and means responsive to predetermined inward movement of said volume control element for stopping the reverse drive of said tape.

3. In a tape recorder or the like including a plural speed tape driving mechanism and electrical control and amplifying apparatus, means for affording selective forward and rewind action of said tape recorder, means for changing the speed of said tape driving mechanism, means for controlling the frequency response of the amplifying apparatus in accordance with the driving speed of the mechanism in said apparatus, a speed change control element rotatably mounted in said tape recorder, means for shifting the speed of said driving mechanism, said speed change control element being adapted to actuate said speed change means in response to manual rotation thereof and simultaneously actuating said frequency control and slide bar means cooperating with said forward and rewind means for affording energization of said forward and rewind means in accordance with the position of said speed change control element.

4. In a tape recorder or the like including a plural speed reversible tape driving mechanism and electrical control and amplifying apparatus, tone, volume and equalization controls in said apparatus speed control means for said driving mechanism, a first knob rotatably mounted in said tape recorder in operative relationship to said means for changing the speed of said driving mechanism and adapted to simultaneously actuate said equalization control, a second knob rotatably and slidably mounted in said tape recorder, shaft means connected to said second knob and adapted to actuate said volume control in response to rotation of said second knob and means for controlling drive of the tape in one direction, shaft means connected to said knob and adapted to actuate said drive control means in response to inward movement of said second knob, a third knob rotatably and slidably mounted in said tape recorder, shaft means connected to said third knob for actuating said tone control and means for controlling drive of the tape in a reverse direction, said third control knob and shaft means connected thereto being adapted to actuate said reverse drive means in response to inward movement thereof relative to said tape recorder, said second knob and shaft means being adapted to stop said reverse drive in response to predetermined inward movement thereof, and slide bar means cooperating with said first, second and third knobs and means associated therewith for controlling energization of said drive means in accordance with the angular position of said first knob and the axial position of said second and third knobs.

5. In a tape recorder or the like including a reversible tape driving mechanism, volume control means and tone control means, a volume control element rotatably and slidably mounted in said tape recorder, shaft means connected to said volume control element and adapted to adjust said volume control means in response to rotation of said volume control element, a tone control element rotatably and slidably mounted in said tape recorder, shaft means connected to said tone control means and said tone control element for adjusting said tone control means in response to rotative movement of said tone control element, pulley means associated with a forward driving movement of said driving mechanism, pulley means associated with a reverse driving movement of said driving mechanism, lever means responsive to depression of said tone control element and said volume control element for energizing said reverse driving means and said forward driving means selectively, pulley means shiftable by said lever means, said tone control element being adapted to effect reverse energization of said driving mechanism when moved slidably inwardly in said tape recorder and said volume control element being adapted to stop said reverse driving means when moved slidably inwardly a predetermined intermediate extent and to effect forward movement of said driving mechanism when moved inwardly to a further extent.

6. In a tape recorder or the like, a reversible tape driving mechanism including a control member shiftable in one direction from a neutral position to a first position, pulley means adapted to cause drive of the tape in a forward direction in response to shift of said control member in said one direction, said control member being shiftable in an opposite direction from said neutral position to a second position, said pulley means being effective to cause drive of the tape in a reverse direction in response to shiftable movement of said control means in said second position, means urging said control member toward said second position, means for latching said member against movement from said neutral position to said second position, a first control knob for moving said control member toward said first position, and a second control knob for releasing said latch means.

7. A tape recorder or the like comprising a driving shaft, manually adjustable means for effecting driving relationship between a tape and said driving means, said means having an inoperative position and an operative position, a rewind pulley means, a forward pulley means, a pulley adapted to engage said rewind or forward pulley means selectively and lever means carrying said pulley, slide means controlling the position of said lever means, means carried by said manually adjustable means for controlling said lever means, a recording element adapted to release said slide means and cooperating with said manually adjustable means to place said tape drive means in operative position, a tone control, a manually operable tone control element rotatably and slidably mounted in said tape recorder, shaft means on said tone control element adapted to actuate said tone control in response to rotation of said tone control element, a volume control, a volume control element rotatably and slidably mounted in said tape recorder and shaft means on said volume control element adapted to actuate said volume control in response to rotation of said volume control element, said volume control element being adapted to cooperate with said slide means to afford stopping of said rewind movement in response to a predetermined inward movement of said volume control element and to effect forward movement of said driving mechanism in response to further movement of said volume control element inwardly, said tone control element being adapted to cooperate with said slide means to afford rewind of said driving mechanism when said manually adjustable element is in operative position.

References Cited in the file of this patent

UNITED STATES PATENTS

| | | |
|---|---|---|
| 2,411,891 | Owens | Dec. 3, 1946 |
| 2,469,924 | Kunz | May 10, 1949 |
| 2,481,004 | Dale | Sept. 6, 1949 |
| 2,535,498 | Kornei | Dec. 26, 1950 |
| 2,639,333 | Howell et al. | May 19, 1953 |
| 2,652,729 | Dale | Sept. 22, 1953 |
| 2,682,578 | Claras | June 29, 1954 |